(12) United States Patent
Cort

(10) Patent No.: US 7,686,960 B2
(45) Date of Patent: Mar. 30, 2010

(54) MULTISTAGE PROCESS FOR TREATING WATER UTILIZING IN ONE STAGE MAGNETIC SEED TO SORB DISSOLVED CONTAMINANTS, AND IN ANOTHER STAGE UTILIZING MAGNETIC SEED TO CLARIFY THE WATER

(76) Inventor: Steven L. Cort, 411 Bathgate La., Cary, NC (US) 27513

( * ) Notice: Subject to any disclaimer, the term of this patent is extended or adjusted under 35 U.S.C. 154(b) by 0 days.

(21) Appl. No.: 11/862,511

(22) Filed: Sep. 27, 2007

(65) Prior Publication Data

US 2008/0073271 A1 Mar. 27, 2008

Related U.S. Application Data

(60) Provisional application No. 60/847,374, filed on Sep. 27, 2006.

(51) Int. Cl.
*C02F 1/28* (2006.01)
*C02F 1/48* (2006.01)
*C02F 1/52* (2006.01)

(52) U.S. Cl. ............. 210/666; 210/631; 210/670; 210/694; 210/695; 210/711; 210/713; 210/714; 210/727; 210/728; 210/738

(58) Field of Classification Search ............. 210/631
See application file for complete search history.

(56) References Cited

U.S. PATENT DOCUMENTS

| 3,697,420 | A | * | 10/1972 | Blaisdell et al. | 210/695 |
|---|---|---|---|---|---|
| 4,039,447 | A | * | 8/1977 | Miura et al. | 210/425 |
| 4,193,866 | A | * | 3/1980 | Slusarczuk et al. | 210/625 |
| 4,279,756 | A | * | 7/1981 | Weiss et al. | 210/667 |
| 4,735,725 | A | * | 4/1988 | Reischl et al. | 210/616 |
| 4,981,593 | A | * | 1/1991 | Priestley et al. | 210/613 |
| 5,244,580 | A | * | 9/1993 | Li | 210/666 |
| 6,099,738 | A | * | 8/2000 | Wechsler et al. | 210/695 |
| 6,478,955 | B1 | * | 11/2002 | Saho et al. | 210/223 |
| 6,896,815 | B2 | * | 5/2005 | Cort | 210/695 |
| 7,001,519 | B2 | | 2/2006 | Linden et al. | |
| 7,255,793 | B2 | | 8/2007 | Cort | |
| 7,371,320 | B2 | * | 5/2008 | Yoda et al. | 210/202 |
| 2005/0230299 | A1 | * | 10/2005 | Saho et al. | 210/223 |

OTHER PUBLICATIONS

Apblett, "Novel Materials for Facile Separation of Petroleum Products from Aqueous Mixtures Via Magnetic Filtration," EPA Grant No. R827015-01-0, Jul. 2001, pp. 1-2.*

* cited by examiner

*Primary Examiner*—Peter A Hruskoc
(74) *Attorney, Agent, or Firm*—Michael de Angeli

(57) ABSTRACT

A multi-stage process for removing dissolved contaminants and suspended solids from water employing a magnetic separation technique. The process includes two tanks and magnetic seed. In the first tank, water is clarified by magnetic technologies and in the second tank dissolved solutes are sorbed on magnetic seed.

14 Claims, 1 Drawing Sheet

MULTISTAGE PROCESS FOR TREATING WATER UTILIZING IN ONE STAGE MAGNETIC SEED TO SORB DISSOLVED CONTAMINANTS, AND IN ANOTHER STAGE UTILIZING MAGNETIC SEED TO CLARIFY THE WATER

CROSS-REFERENCE TO RELATED APPLICATION

This application claims priority under 35 U.S.C. §119(e) from the following U.S. provisional application: Application Ser. No. 60/847,374 filed on Sep. 27, 2006. That application is incorporated in its entirety by reference herein.

FIELD OF THE INVENTION

The present invention relates to treating water, and more particularly to utilizing magnetic seed, such as magnetite, to remove dissolved contaminants from the water and to clarify the water.

SUMMARY OF THE INVENTION

The present invention relates to a multi-stage process of removing dissolved contaminants and suspended solids from water employing a magnetic separation technique. The process includes, in a first stage, directing water into a first tank and mixing the water with magnetic seed and flocculant. The flocculant binds suspended solids in the water to the magnetic seed forming magnetic floc. A magnetic collector collects the magnetic floc, which are then removed from the collector. In a second stage, water is directed into a second tank and mixed with magnetic seed. The magnetic seed may be coated, for example with a polymer. The magnetic seed or the coated magnetic seed sorb dissolved contaminants in the water. A magnetic collector collects the magnetic seed with the sorbed contaminants to allow the contaminants to be removed from the water.

DETAILED DESCRIPTION OF THE INVENTION

Figure 1:
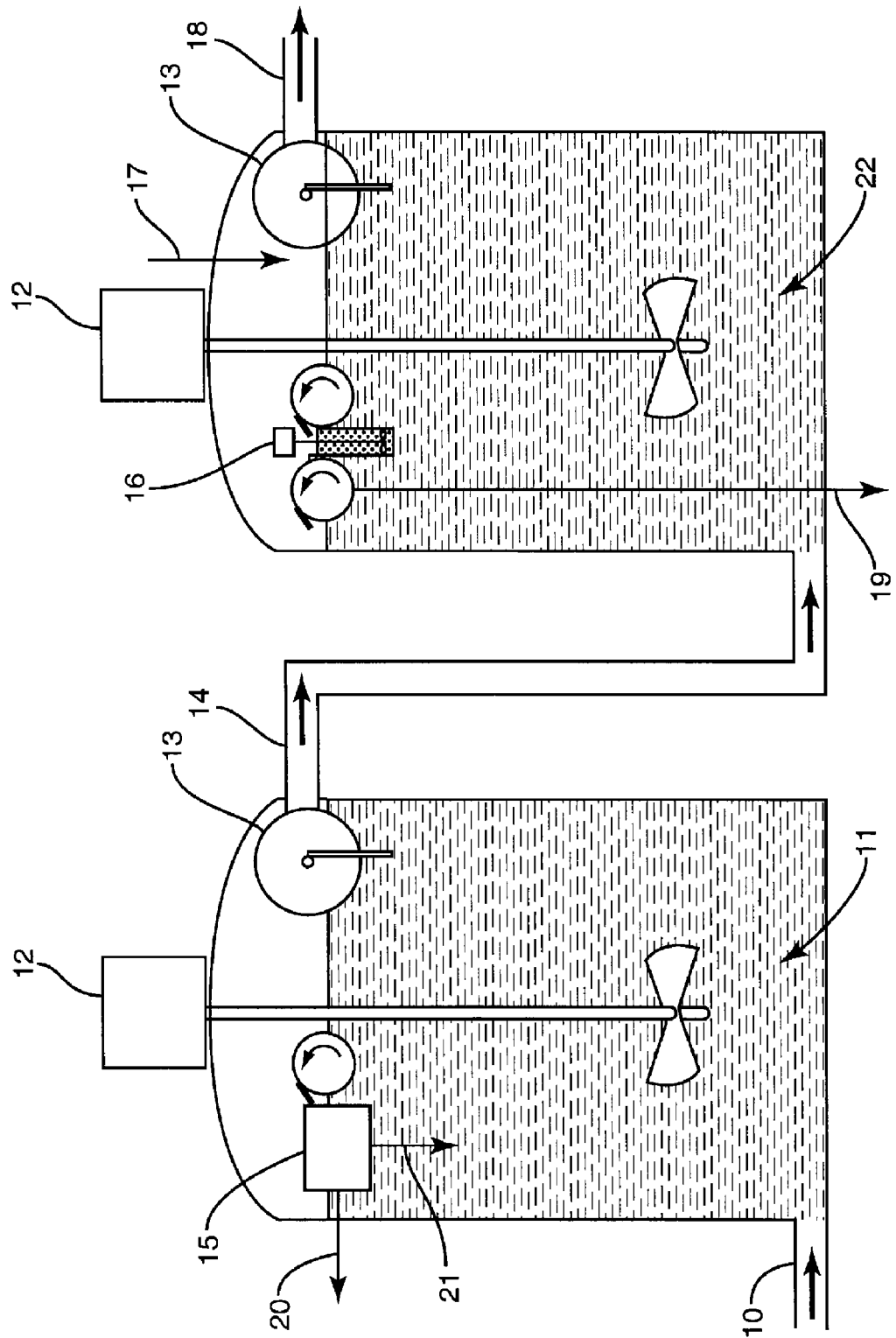
FIG. 1 is a schematic illustration of the multistage process of the present invention that utilizes magnetic sorption and magnetic clarification.

A known commercial use of magnetic treatment technologies is the "Sirofloc" technology used in Australia to clean drinking water. This process uses the absorption capacity of magnetite to remove color and other pollutants from water. The spent magnetic seed material (magnetite) settles out by gravity in a clarifier and then is pumped to a magnetite regeneration step that cleans the magnetite so it can be reused.

In Sly et al., U.S. Pat. No. 5,443,729 issued Aug. 22, 1995, a method was described using magnetite as a bed material in a fluidized bed bioreactor to remove manganese from water. Manganese is the only pollutant identified as suitable for this type of treatment, and *pedomicrobium manganicum* is the only microorganism disclosed. There is no mention of use of the magnetic properties of magnetite to prevent ferromagnetic solids from leaving the bioreactor.

In an Australian patent 534 238, to Weiss it was shown that microorganisms attach strongly to magnetite without diminishing their capacity to function microbiologically. Mac Rae and Evans, in Factors Influencing the Adsorption of Bacteria to Magnetite in Water and Wastewater, Water Res. 17: 271-277 (1983), and Removal of Bacteria from Water by Adsorption to Magnetite, Water Res. 18: 1377-1380 (1984) show that magnetite rapidly adsorbed 95-99% of a variety of microbial cells from aqueous suspensions.

This application discloses use of the magnetic properties of magnetite in a system for magnetically capturing particles and other contaminants, that is, the magnetic properties of magnetite are exploited in separation of the pollutants from the water stream to be treated.

Magnetite is a suitable bed material for biofilm growth to biologically treat dissolved organics. More specifically, there are a large number of other biofilms that can be attached to magnetite. The bacteria that make up these biofilms can be selected to target specific pollutants. The specific targeted pollutants include but are not limited to organics found in municipal wastewater treatment plants, sulfates found in acid mine drainage and cooling water, organics found in ground water contamination, oil and grease from industrial processes, and chlorinated solvents.

It is reasonable to believe that a wide range of biofilms can be attached to magnetite for treating a wide range of dissolved pollutants. The Sly patent states that "magnetite particles used in the Sirofloc water purification process have the necessary density and surface characteristics for a suitable support particle."

In summary, the Sly patent shows the significant advantage of a fluidized bed bioreactor to treat water because of its low pressure drop and the high surface area of the bed material. It also shows the suitability of magnetite as a bed material for the growth of a biofilm to treat manganese. As noted, however, the Sly patent only discloses use of one microorganism, *pedomicrobium manganicum*, to remove one pollutant, manganese.

The present process relates to use of Polymer Coated Magnetite (PCM), which has the ability to absorb dissolved organic or inorganic pollutants from water. Research performed at Oklahoma State University by Dr. Allen Apblett under EPA Grant Number: R827015-01-0 shows methods for imparting magnetic properties to activated carbon and coating magnetite with polymers such as polydimethylsiloxane (PDMS) for the absorption of dissolved hydrocarbons from water. Hydrocarbon removal efficiency was shown to exceed 99.9+%. This proof of concept demonstrated that magnetic extractants in combination with magnetic filtration are capable of removing hydrocarbons from water and in breaking oil in water emulsions. Specialized fine magnetic absorbents have improved mass transfer kinetics of absorption, reduced pressure drop through the treatment system, and are easy to remove from water with a magnetic separator.

According to one aspect of the present invention, the two magnetite based treatment technologies are used to provide an effective approach to treating organics. Biological treatment is effective, inexpensive, and produces less sludge than chemical treatment systems. Combining biological treatment and magnetic separation is an added advantage because the solid residence time (SRT) can be significantly increased. However, bacteria are slow acting and therefore require large process tankage. Absorption of pollutants is much faster than biological treatment and therefore reduces the size of tankage. Magnetite can be modified to enhance its absorption properties. This can be done by combining it with activated carbon or coating the magnetite with special polymers that have an affinity for dissolved solutes or organics. This PCM can contain small particles which improves absorption kinetics and capacity. Combining these two technologies together makes a very effective treatment system. The magnetite absorption media quickly removes the organics from the waste stream and concentrates these wastes. This reduces tankage size and does not add treatment chemicals that increase sludge quantities. These concentrated wastes then can be cleaned off the PCM either biologically, chemically, or by heat so that the PCM can be reused.

The addition of a flocculating polymer is an appropriate step in most magnetic seeding processes. The flocculating polymer is used to attach magnetic particles to non-magnetic particles so the combined particles can be removed from the water with a magnetic device. However, the use of PCM to absorb dissolved hydrocarbons may be affected by the addition of a flocculating polymer. At a minimum, the flocculating polymer in some cases may cause the particles to come together and reduce their surface area. The flocculating polymer will be absorbed onto the surface of the PCM and reduce its capacity to absorb other dissolved pollutants. This can affect the absorption properties of activated carbon and polymers. Use of too high a concentration of flocculating polymer can have an adverse effect on biological activity. Since using flocculating polymers to clarify water may interfere with the absorption properties of the PCM or with the biological action of bacteria, a two-step process can be used.

The first stage of treatment is the absorption of organics, e.g. hydrocarbons, on the PCM. The PCM is kept in the first stage treatment tank with a magnetic separator. A PCM cleaning system that uses, for example, biological treatment to digest organics, thermal treatment to volatilize the organics, ozone to oxidize organics, adjustment of pH to repel the organics (as performed in the Sirofloc process), or solvents to extract the organics, is provided to regenerate the PCM, so it can be reused to absorb dissolved pollutants. In one embodiment, other solid pollutants in the waste stream that are not magnetic or absorbed onto the PCM will pass through the absorption phase of treatment into a secondary clarification phase. This secondary clarification phase uses a flocculating polymer to attach the non-magnetic particles to a magnetic seed material. This clarification stage also has a cleaning system to clean the magnetite seed material.

Accordingly, the present application is directed to the use of a multistage treatment process that uses a sorption stage and a clarification stage for the removal of dissolved pollutants and solids from water. Each stage uses some form of magnetic seeding/separation technology and magnetic seed cleaning.

With particular reference to FIG. 1, a multistage process is disclosed therein. Water to be treated containing solids, dissolved inorganic or organic pollutants flow through an inlet 10 into a reactor or tank 11. Disposed in tank 11 is an agitator or mixer 12. Injected into the tank 11 is magnetic seed. The magnetic seed may be in various forms and can include PCM, enhanced magnetite, zerovalent iron, ferromagnetic material, or magnetic activated carbon. The magnetic seed, whether coated or uncoated, is referred to as magnetic particles. The mixer 12 is driven so as to maintain the magnetic particles in suspension and generally uniform throughout the tank 11.

Located in the tank 11 are two magnetic devices. One is a cleaning system 15 and the other is a magnetic collector 13 that keeps the magnetic particles contained within the treatment tank 11. Cleaning system 15 acts to collect the magnetic particles such as PCM or other coated magnetic seed on a magnetic collector, and separates the pollutants or contaminants adsorbed onto the magnetite particle from the coated magnetic seed. In the case of magnetite coated with a biofilm, for example, a magnetic cleaning system may not be required. The separated contaminants are discharged through line 20 and the cleaned magnetic seed or coated magnetic seed is returned through line 21 to the tank 11 to be reused. The second magnetic device 13 located in tank 11 is a final magnetic collector that prevents magnetic seed or coated magnetic seed from exiting tank 11.

In one embodiment, the magnetic collector 13 includes a rotary disk magnetic collector with a series of scrapers that scrape collected magnetic seed or coated magnetic seed from the collector and direct the magnetic seed or coated magnetic seed back into the tank 11 where the magnetic seed or coated magnetic seed can be reused.

In a second phase or stage, the water is clarified by removing suspended solids from the water. In this stage, a second tank or vessel 22 is used. Here magnetic seed and a flocculant polymer are mixed with the water in tank 22. The polymer can be added through line 17. By mixing the magnetic seed such as magnetite and the flocculant, suspended solids tend to agglomerate around magnetic seed and form magnetic floc. The mixer 12 maintains the magnetic floc in suspension, and during the process the magnetic floc grows as more suspended solids agglomerate.

To remove the magnetic floc, and hence the suspended solids, from the tank 22, there is provided two magnetic collection or separation devices. The first is a magnetic cleaning system 16. The magnetic cleaning system 16 typically includes one or more magnetic collectors and a shear chamber. In the example shown, one magnetic collector is in the form of a rotary magnetic collector and collects magnetic floc thereon. The magnetic floc collected is scraped from the magnetic collector and falls into a shear chamber where the magnetic floc is sheared, resulting in a sheared slurry comprising magnetic seed and sludge. A second magnetic collector disposed to the left of the shear tank, as shown in FIG. 1, collects the separated magnetic seed and returns the magnetic seed to tank 22. The separated sludge is collected and directed out sludge line 19.

The second magnetic collection system associated with tank 22 is a final magnetic collector 13 disposed adjacent outlet 18. Magnetic collection system 13 typically includes a rotary magnetic collector for collecting any magnetic floc that is contained in water being directed from tank 22 through outlet 18.

Therefore, it is appreciated that the present process is a multistage, or phase, process. In one phase, contaminants in solution are sorbed by a magnetic material such as magnetite that may be coated with a polymer, activated carbon, biofilm, etc. In another phase, suspended solids are removed by a magnetic clarification process. In FIG. 1, the magnetic sorption process precedes the clarification process. It should be appreciated that the staging can be reversed, with magnetic clarification being performed prior to magnetic sorption.

In disclosing and describing the methods and systems for treating water, magnetic seeding and magnetic separation have been disclosed as a means of clarifying and removing contaminants from the water. Generally, magnetic seeding and separation entails mixing magnetic seed, such as magnetite, with the water being treated. Through flocculation, adsorption, absorption and other physical or chemical means, contaminants such as dissolved organics, suspended solids, scalants, heavy metals, etc. attach to the magnetic seed to form magnetic particles or magnetic floc. In the case of flocculation, a coagulant and a flocculant may be mixed with the water. Typically, the process of magnetic separation entails utilizing a magnetic collector such as a rotary magnetic drum or a series of rotary magnetic disks. Such collectors are at least partially submerged in the water being treated and are driven. In the process, magnetic particles or magnetic floc are collected by the magnetic collector. These magnetic particles or magnetic floc are removed from the magnetic collector and directed to a shear chamber. In the shear chamber, the magnetic particles or magnetic floc are sheared, separating the magnetic seed and effectively producing magnetic seed and sludge. The same magnetic collector, or a second magnetic collector, can be utilized to collect the separated magnetic seed. After the magnetic seed has been collected by the magnetic collector, the seed is removed from the magnetic collector and returned to the same treatment tank or chamber, or otherwise recycled. The separated sludge is collected and directed from the system or process.

Reference is made to the magnetic seeding and subsequent separation techniques disclosed in application Ser. No. 11/503,951 (the '951 application) and U.S. Pat. No. 7,255,793. The disclosures of the '951 application and U.S. Pat. No. 7,255,793 are expressly incorporated herein by reference.

As used herein the term "water" includes water and all forms of wastewater. "High rate clarifiers" are defined as clarifiers that have a surface overflow rate greater than five gallons per minute per square foot of surface area. The terms "absorption" and "adsorption" are used interchangeably and are not intended to be limiting. "Sorb" and "sorption" are used to refer to both absorption and adsorption.

The invention claimed is:

1. A process for removing dissolved contaminants and suspended solids from water utilizing magnetic seed and magnetic separation comprising the steps of:
   a. in a first tank, removing suspended solids by mixing the water with a first magnetic seed comprising uncoated magnetic particles and a flocculant to produce a magnetic floc including said suspended solids;
   b. collecting the magnetic floc on a first magnetic collector in said first tank;
   c. in a second tank, removing dissolved contaminants by mixing a second magnetic seed with the water, wherein the second magnetic seed comprises magnetic particles coated with a polymer, activated carbon or biofilm, to form coated magnetic particles;
   d. removing dissolved contaminants from the water by sorbing the dissolved contaminants on the coated magnetic particles; and
   e. collecting the coated magnetic particles with the contaminants sorbed thereon on a second magnetic collector in the second tank.

2. The process of claim 1 wherein the suspended solids are removed from water prior to the dissolved contaminants being sorbed onto the coated magnetic particles.

3. The process of claim 1 including the step of separating the sorbed contaminants from the coated magnetic particles by biological treatment, thermal treatment, oxidation, pH adjustment, or solvent extraction.

4. The process of claim 3 including the step of recycling the coated magnetic particles and discharging the separated contaminants from the process.

5. The process of claim 1 including the steps of directing the magnetic floc to a shearing device, shearing the magnetic floc to separate the magnetic seed from sludge, and recycling the magnetic seed and discharging the sludge.

6. The process of claim 1 wherein the magnetic seed in the second tank is coated with polydimethylsiloxane.

7. The process of claim 1 including the steps of directing clarified water from the first tank and generally preventing the magnetic seed from being discharged from the first tank.

8. The process of claim 1, wherein the coating on the particles of the second magnetic seed is any polymer that includes an affinity for sorbing dissolved solutes.

9. The process of claim 1 wherein the magnetic particles comprised by both first and second magnetic seeds are magnetite, zerovalent iron, or a ferromagnetic material.

10. A multistage process for treating water utilizing, in one stage, a first magnetic seed to remove dissolved contaminants from the water and utilizing, in another stage, a second magnetic seed to clarify the water, the method comprising:
    in a first stage
       directing the water into a first tank;
       mixing a first magnetic seed comprising uncoated magnetic particles and a flocculant with the water in the first tank, giving rise to the formation of magnetic floc, where the magnetic floc includes the first magnetic seed and suspended solids agglomerated around the first magnetic seed;
       collecting the magnetic floc on a first magnetic collector disposed in the first tank; and
       removing the magnetic floc from the first magnetic collector; and
    in a second stage
       directing the water into a second tank;
       mixing of a second magnetic seed
       comprising magnetic particles coated with a polymer activated carbon, or biofilm with the water in the second tank;
       sorbing the dissolved contaminants in the water onto the second magnetic seed; and
       collecting the second magnetic seed with the sorbed contaminants thereon on a second magnetic collector disposed in the second tank.

11. The process of claim 10 wherein the process of the first stage precedes the process of the second stage.

12. The process of claim 10 wherein the process of the second stage precedes the process of the first stage.

13. The process of claim 10 wherein the second magnetic seed in the second stage comprises particles of any magnetic polymer coated with a material capable of sorbing dissolved solutes from water.

14. A process for removing dissolved contaminants and suspended solids from water utilizing first and second magnetic seeds and first and second magnetic separation steps, comprising:
    a. in a first tank, removing suspended solids by mixing the water with a first magnetic seed comprising magnetic particles coated with a polymer, activated carbon, or biofilm and a flocculant to produce a magnetic floc comprising suspended solids;
    b. collecting the magnetic floc on a first magnetic collector in the first tank;
    c. in a second tank, removing dissolved contaminants by mixing a second magnetic seed with the water, wherein the second magnetic seed comprises uncoated magnetic particles as an effective sorbant;
    d. removing dissolved contaminants from the water by sorbing the dissolved contaminants on the second magnetic seed; and
    e. collecting the second magnetic seed on a second magnetic collector in the second tank.

* * * * *